US012288411B2

United States Patent
Gardner et al.

(10) Patent No.: US 12,288,411 B2
(45) Date of Patent: Apr. 29, 2025

(54) TECHNIQUES FOR EXTRACTING ASSOCIATIONS BETWEEN TEXT LABELS AND SYMBOLS AND LINKS IN SCHEMATIC DIAGRAMS

(71) Applicant: Bentley Systems, Incorporated, Exton, PA (US)

(72) Inventors: Marc-Andrè Gardner, Quebec (CA); Simon Savary, Quebec (CA); Louis-Philippe Asselin, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 350 days.

(21) Appl. No.: 17/961,337

(22) Filed: Oct. 6, 2022

(65) Prior Publication Data

US 2024/0119751 A1    Apr. 11, 2024

(51) Int. Cl.
*G06V 10/00*    (2022.01)
*G06T 9/00*    (2006.01)
(Continued)

(52) U.S. Cl.
CPC .......... *G06V 30/19173* (2022.01); *G06T 9/00* (2013.01); *G06V 10/82* (2022.01);
(Continued)

(58) Field of Classification Search
CPC ............ G06N 3/08; G06N 3/02; G06N 3/042; G06N 3/045; G06N 3/047; G06N 3/082;
(Continued)

(56) References Cited

U.S. PATENT DOCUMENTS 5,097,422 A * 3/1992 Corbin, II ............... G06F 30/39
716/112
5,111,413 A * 5/1992 Lazansky ................ G06F 30/33
703/13
(Continued)

FOREIGN PATENT DOCUMENTS

EP    3660743 A1    6/2020
JP    3445394 B2    9/2003
(Continued)

OTHER PUBLICATIONS

Bunke, Horst, "Automatic Interpretation of Lines and Text in Circuit Diagrams," J. Kittler, K. S. Fu, and L. F. Pau (editors), D. Reidel Publishing Company, Pattern Recognition Theory and Applications, 1982, pp. 297-310.
(Continued)

*Primary Examiner* — Amir Alavi
(74) *Attorney, Agent, or Firm* — Cesari and McKenna, LLP; James A. Blanchette

(57) ABSTRACT

In example embodiments, techniques are provided that use two different ML models (a symbol association ML model and a link association ML model), one to extract associations between text labels and one to extract associations between symbols and links, in a schematic diagram (e.g., P&ID) in an image-only format. The two models may use different ML architectures. For example, the symbol association ML model may use a deep learning neural network architecture that receives for each possible text label and symbol pair both a context and a request, and produces a score indicating confidence the pair is associated. The link association ML model may use a gradient boosting tree architecture that receives for each possible text label and link pair a set of multiple features describing at least the geometric relation- (Continued)

ship between the possible text label and link pair and produces a score indicating confidence the pair is associated.

20 Claims, 11 Drawing Sheets

(51) Int. Cl.
*G06V 10/82* (2022.01)
*G06V 30/14* (2022.01)
*G06V 30/19* (2022.01)
*G06V 30/422* (2022.01)

(52) U.S. Cl.
CPC .... *G06V 30/1448* (2022.01); *G06V 30/19147* (2022.01); *G06V 30/1916* (2022.01); *G06V 30/422* (2022.01)

(58) Field of Classification Search
CPC .. G06N 3/0092; G06N 3/0454; G06N 3/0475; G06N 3/0464; G06V 30/19173; G06V 30/422; G06V 30/19147; G06V 30/1916; G06V 30/1448; G06V 10/82; G06V 20/00; G06V 20/10; G06V 20/20; G06T 9/00

See application file for complete search history.

(56) References Cited

U.S. PATENT DOCUMENTS

| | | | | |
|---|---|---|---|---|
| 5,164,911 | A * | 11/1992 | Juran | G06F 30/3308 |
| | | | | 703/2 |
| 5,351,197 | A * | 9/1994 | Upton | H01L 27/0207 |
| | | | | 716/120 |
| 5,594,809 | A | 1/1997 | Kopec et al. | |
| 5,617,327 | A * | 4/1997 | Duncan | G06F 30/30 |
| | | | | 703/14 |
| 5,625,798 | A | 4/1997 | Badders et al. | |
| 7,574,048 | B2 | 8/2009 | Shilman et al. | |
| 8,775,934 | B2 * | 7/2014 | Nasle | G06F 30/20 |
| | | | | 715/740 |
| 8,837,294 | B2 * | 9/2014 | Frishberg | H04L 43/045 |
| | | | | 370/242 |
| 8,977,527 | B2 | 3/2015 | McKim et al. | |
| 9,015,016 | B2 * | 4/2015 | Lorenz | G06F 30/3308 |
| | | | | 703/3 |
| 9,721,157 | B2 | 8/2017 | Frank et al. | |
| 9,811,251 | B2 | 11/2017 | Kling et al. | |
| 10,558,780 | B1 * | 2/2020 | Kukal | G06F 30/33 |
| 11,501,470 | B2 | 11/2022 | Hassan et al. | |
| 11,521,026 | B2 | 12/2022 | Lapointe et al. | |
| 11,593,666 | B2 * | 2/2023 | McCarthy | G06F 18/2113 |
| 11,842,035 | B2 | 12/2023 | Jahjah et al. | |
| 2001/0033694 | A1 | 10/2001 | Goodman et al. | |
| 2003/0130992 | A1 | 7/2003 | Tyan et al. | |
| 2005/0155030 | A1 | 7/2005 | DeWitt, Jr. et al. | |
| 2007/0022399 | A1 * | 1/2007 | Tsai | G06F 30/30 |
| | | | | 716/102 |
| 2007/0201752 | A1 | 8/2007 | Gormish et al. | |
| 2008/0052638 | A1 | 2/2008 | Frank et al. | |
| 2008/0063279 | A1 | 3/2008 | Vincent et al. | |
| 2009/0074300 | A1 | 3/2009 | Hull et al. | |
| 2009/0100050 | A1 | 4/2009 | Erol et al. | |
| 2009/0292514 | A1 | 11/2009 | McKim et al. | |
| 2009/0313245 | A1 | 12/2009 | Weyl et al. | |
| 2011/0007366 | A1 | 1/2011 | Sarkar et al. | |
| 2012/0116559 | A1 | 5/2012 | Davis et al. | |
| 2012/0134576 | A1 | 5/2012 | Sharma et al. | |
| 2012/0284012 | A1 | 11/2012 | Rodriguez et al. | |
| 2013/0173632 | A1 | 7/2013 | Birdwell et al. | |
| 2014/0009612 | A1 | 1/2014 | King | |
| 2014/0080428 | A1 | 3/2014 | Rhoads et al. | |
| 2014/0336992 | A1 | 11/2014 | Kling et al. | |
| 2015/0269431 | A1 | 9/2015 | Haji et al. | |
| 2016/0161930 | A1 | 6/2016 | Jirkovsky et al. | |
| 2017/0061031 | A1 | 3/2017 | Jammikunta et al. | |
| 2017/0351708 | A1 | 12/2017 | Lahmann et al. | |
| 2018/0114101 | A1 | 4/2018 | Desai et al. | |
| 2019/0012424 | A1 | 1/2019 | Brookshire | |
| 2020/0005094 | A1 | 1/2020 | Sinha et al. | |
| 2020/0175211 | A1 | 6/2020 | Kang et al. | |
| 2020/0175372 | A1 | 6/2020 | Sharma et al. | |
| 2020/0184278 | A1 | 6/2020 | Zadeh et al. | |
| 2021/0096523 | A1 | 4/2021 | Stump et al. | |
| 2021/0174128 | A1 | 6/2021 | Charnock et al. | |
| 2021/0278960 | A1 | 9/2021 | Mabote | |
| 2021/0279271 | A1 | 9/2021 | Khanafer et al. | |
| 2022/0044146 | A1 | 2/2022 | Gardner et al. | |
| 2022/0319219 | A1 | 10/2022 | Tsibulevskiy et al. | |
| 2024/0119751 | A1 * | 4/2024 | Gardner | G06T 9/00 |

FOREIGN PATENT DOCUMENTS

| | | |
|---|---|---|
| WO | WO-2014/075174 A1 | 5/2014 |
| WO | WO-2020/005541 A1 | 1/2020 |
| WO | WO-2021/021624 A1 | 2/2021 |

OTHER PUBLICATIONS

Duda, Richard O., et al., "Use of the Hough Transformation to Detect Lines and Curves in Pictures," Association of Computing Machinery, Inc., Graphics and Image Processing, Communications of the ACM, vol. 15, No. 1, Jan. 1972, pp. 11-15.

"European Search Report and Written Opinion," European Application No. 21 150 316.4-1207, Applicant: Bentley Systems, Incorporated, Date of Mailing: Jun. 8, 2021, pp. 1-10.

"European Search Report and Written Opinion," European Application No. 21 150 319.8-1207, Applicant: Bentley Systems, Incorporated, Date of Mailing: Jun. 9, 2021, pp. 1-8.

Julca-Aguilar, Frank D., et al., "Symbol Detection in Online Handwritten Graphics Using Faster R-CNN," IEEE, 2018 13th IAPR International Workshop on Document Analysis Systems, Apr. 24, 2018, pp. 151-156.

Mani, Shouvik, et al., "Automatic Digitization of Engineering Diagrams using Deep Learning and Graph Search," IEEE, 2020 IEEE/CVF Conference on Computer Vision and Pattern Recognition Workshops (CVPRW), Jun. 14, 2020, pp. 673-679.

Moon, Yoochan, et al., "Deep Learning-Based Method to Recognize Line Objects and Flow Arrows from Image-Format Piping and Instrumentation Diagrams for Digitization," MDPI, Applied Sciences, vol. 11, No. 10054, Oct. 27, 2021, pp. 1-21.

Moreno-Garcia, et al., "New Trends on Digitization of Complex Engineering Drawings," Springer, Neural Computing and Applications, vol. 31, Jun. 13, 2018, pp. 1695-1712.

Paliwal, Shubham, et al., "Digitize-PID: Automatic Digitization of Piping and Instrumentation Diagrams," arXiv, arXiv: 2109.03794v1 [cs.CV], Sep. 8, 2021, pp. 1-13.

Rezvanifar, Alireza, et al., "Symbol Spotting on Digital Architectural Floor Plans Using A Deep Learning-Based Framework," IEEE, 2020 IEEE/CVF Conference on Computer Vision and Pattern Recognition Workshops (CVPRW), Jun. 14, 2020, pp. 2419-2428.

U.S. Appl. No. 17/034,844, filed Sep. 28, 2020 by Marc-André Lapointe, et al. for Classifying Individual Elements of an Infrastructure Model, pp. 1-27.

U.S. Appl. No. 17/128,912, filed Dec. 21, 2020 by Karl-Alexandre Jahjah, et al. for Techniques for Labeling, Reviewing and Correcting Label Predictions for P&Ids, pp. 1-44.

U.S. Appl. No. 17/129,205, filed Dec. 21, 2020 by Marc-André Lapointe, et al. for Techniques for Extracting Machine-Readable Information From P&IDS, pp. 1-29.

Yu, Eun-seop, et al., "Features Recognition from Piping and Instrumentation Diagrams in Image Format Using a Deep Learning Network," MDPI, Engines, vol. 12, No. 4425, Nov. 21, 2019, pp. 1-19.

Zhou, Xingyi, et al., "Objects as Points," arXiv, arXiv: 1904.07850v2 [cs.CV], Apr. 25, 2019, pp. 1-12.

(56) References Cited

OTHER PUBLICATIONS

Adam, S., et al., "Symbol and Character Recognition: Application to engineering Drawings," Springer-Verlag 2000, International Journal on Document Analysis and Recognition, IJDAR, vol. 3, Dec. 2000, pp. 89-101.

Ghadekar, Premanand, et al., "Automatic Digitization of Engineering Diagrams Using Intelligent Algorithms," Science Publications, Journal of Computer Science, vol. 17, No. 9, Sep. 28, 2021, pp. 848-854.

Kang, Sung-O, et al., "A Digitization and Conversion Tool for Imaged Drawings to Intelligent Piping and Instrumentation Diagrams (P&ID)," MDPI, Energies, vol. 12, No. 2593, Jul. 5, 2019, pp. 1-26.

Kim, Byung Chui, et al., "End-to-End Digitization of Image Format Piping and Instrumentation Diagrams at an Industrially Applicable Level," Oxford University Press, Oxford, CDE, Journal of Computational Design and engineering, vol. 9, No. 4, Aug. 2022, pp. 1298-1326.

Llados, Josep, et al., "Symbol Recognition: Current Advances and Perspectives," Springer-Verlag Berlin Heidelberg, GREC 2002, Graphics Recognition Algorithms and Applications, LNCS, Lecture Notes in Computer Science, vol. 2390, Jan. 1, 2002, pp. 104-128.

Rahul, Rohit, et al., "Automatic Information Extraction from Piping and Instrumentation Diagrams," arXiv, arXiv:1901.11383v1 [cs.CV], Jan. 28, 2019, pp. 1-10.

U.S. Appl. No. 17/877,560, filed Jul. 29, 2022 by Marc-André Gardner, et al. for Techniques for Extracting Links and Connectivity From Schematic Diagrams, pp. 1-37.

\* cited by examiner

TECHNIQUES FOR EXTRACTING ASSOCIATIONS BETWEEN TEXT LABELS AND SYMBOLS AND LINKS IN SCHEMATIC DIAGRAMS

BACKGROUND

Technical Field

The present disclosure relates generally to extracting machine-readable information from schematic diagrams and more specifically to techniques for extracting associations between text labels and symbols and links in schematic diagrams in image-only formats.

Background Information

A number of engineering fields utilize schematic diagrams. In contrast to a physical drawing that depicts the specific location, size and shape of components, a schematic diagram conveys information independent of location, size, and shape, focusing instead on function and process. In the field of infrastructure design and maintenance, a common type of schematic diagram is a piping and instrumentation diagram (P&ID). FIG. 1A is a view of a portion of an example P&ID 100. The P&ID includes symbols 110 that represent physical components (e.g., valves, pumps, vessels, instruments, etc.) or abstractions (e.g., off-page references), links 120 that represent connections (e.g., pipes, electrical wires, etc.) between the physical components or abstractions, and text labels 130 that provide descriptions (e.g., names, codes, properties, etc.) of the symbols and links.

A typical engineering project (e.g., infrastructure project) may have hundreds of related schematic diagrams (e.g., P&IDs) that have been created over the course of many years. These schematic diagrams often may only be available in an image-only format (e.g., as a JPG, PNG, BMP, TIFF, PDF, etc.) that lacks machine-readable information defining the symbols, links, and text labels shown in the diagram. Sometimes, an image-only schematic diagram originated from a scan of a printed document and is of fairly low quality, having low resolution and/or including visual artifacts, obscured or blurry portions and the like.

In an image-only format, information in a schematic diagram is hard to validate and difficult to consume. There is an increasing desire to create digital twins, and the information in schematic diagrams is often useful in creating such representations. However, as the information in an image-only format is largely inaccessible to design and modeling software applications, obtaining such information has often involved lengthy manual review and data entry. Even updating a schematic diagram itself is difficult with an image-only format.

Effective techniques have been developed for extracting symbols, links, and text labels from schematic diagrams (e.g., P&IDs) in image-only formats. These include machine learning (ML) techniques and that utilize trained ML models to identify symbols and links and determine their properties, and optical character recognition (OCR) techniques to identify text labels and recognize the text characters therein. However, such existing techniques often do not address, or poorly address, the related problem of extracting associations between text labels and symbols and links. Without accurate associations between text labels and symbols and links, much of the usefulness of the information in schematic diagrams is lost, and they cannot effectively be used in digital twins.

FIG. 1B is annotated view of the example P&ID 100 of FIG. 1A, showing accurately extracted associations between text labels and symbols and links. For example, text label 150 is accurately associated with symbol 152, text label 160 is accurately associated with symbol 162, text label 170 is accurately associated with links 172, 174, text label 180 is accurately associated with symbol 182, etc. However, extracting such associations presents a number of technical challenges, and various approaches that have been, or could be, attempted have failed to produce accurate results.

Some approaches involve distance-based assignation in which a text label is always associated with the closest symbol or link. The distance may be a simple Euclidean distance from center of the text label to the center of the symbol or link, or a more complexly computed distance. In some cases, a maximum distance threshold may be imposed to prevent distance-based assignation from returning associations between text labels and symbols or links that are very far away from each other.

However, distance-based assignation may return inaccurate associations in some situations. The text label closest to a symbol or link may not actually be the label for that symbol or link. Referring back to FIG. 1B, it can be seen that text label 170 is closer to symbols 182, 184 than links 172, 174. Yet text label 170 has no relation to symbols 182, 184. Because of this, associating text 170 label with these closer symbols 182, 184 would lead to the wrong result. Sometimes, arrows in a schematic diagram indicate relations between a text label and a symbol or link that are more important than distance. Due to limited space, a text label may be located far away, and an arrow used to refer it to a symbol or link in a cluttered area of the diagram, or to multiple symbols or links in order to conserve space. Referring back to FIG. 1B, it can be seen that text label 150 is located some distance away from symbol 152 and an arrow 154 is used to refer it to the symbol. Similarly, a double-ended arrow 176 is used to refer text label 170 to links 172, 174. Always associating a text label with the closest symbol or link misses this important information.

Other approaches involve index-based lookups or regular-expression matching. In index-based lookups, text labels in a schematic diagram are matched against a predefined index of labels (e.g., from another source, such as a parts database). Then properties associated with text labels in the index are compared to properties of symbols and links in the schematic diagram to determine matches. For example, if the index indicates a text label is associated with a particular valve type, such valve type may be compared to properties of symbols in the schematic diagram and matched with a valve having the same valve type. In regular-expression matching, a regular expression is defined (e.g., by a user) for what each text label should look like. The regular expression is then used to select a text label to associate from among those within a predetermined distance (e.g., k nearest neighbors) of a symbol or link.

However, index-based lookups and regular-expression matching often are burdensome to implement and still often return inaccurate associations. Both approaches require additional outside information (a predefined index of labels in the case of index-based lookups and a set of defined regular-expressions for regular-expression matching). Such outside information often does not already exist, and is extremely time consuming and burdensome to recreate, for example by manual user entry. Further, the approaches are often too limited to account for various common scenarios, leading to inaccurate results. Index-based lookups may struggle to specifically identify a symbol or link when there are many similar ones in the schematic diagram, with only their positioning differing. Likewise, regular-expression matching still depends on a prior distance-matching (e.g., to determine the k nearest neighbors) and as such, often has shortcomings similar to those discussed above in reference to distance-based assignation.

Accordingly, there is a need for improved techniques for extracting associations between text labels and symbols and links in schematic diagrams (e.g., P&IDs) in image-only formats.

SUMMARY

In various embodiments, improved techniques are provided that use two different ML models (a symbol association ML model and a link association ML model), one to extract associations between text labels and one to extract associations between symbols and links, in a schematic diagram (e.g., P&ID) in an image-only format. Both models are trained to learn a plurality of graphical cues (e.g., including, but not limited to, distance) that indicate a text label references a particular symbol or link. The two models may use different ML architectures. For example, the symbol association ML model may use a deep learning neural network architecture that receives for each possible text label and symbol pair both a context (a region of the schematic diagram surrounding the possible text label and symbol pair) and a request (a precise designation of the possible text label and symbol pair), and produces a score indicating confidence the pair is associated. The link association ML model may use a gradient boosting tree architecture that receives for each possible text label and link pair a set of multiple features (e.g., a multidimensional feature vector) describing at least the geometric relationship between the possible text label and link pair, and produces a score indicating confidence the pair is associated. Pre-processing and/or post processing may be performed to exclude certain cases from the ML models (e.g., to improve performance) or refine results therefrom (e.g., to improve accuracy). The improved techniques may be robust and adaptable to different drawing conventions, with strong generalization ability for previously unseen content. In such manner, they may offer significant advantages over distance, index-based lookup, and regular-expression matching approaches.

In one specific embodiment, a schematic diagram data extraction application accesses a schematic diagram and a set of texts labels, a set of symbols, and a set of links that have been extracted from the schematic diagram. The schematic diagram data extraction application determines possible text label and symbol pairs from the set of texts labels and the set of symbols. The schematic diagram data extraction application, for each possible text label and symbol pair, applies to a symbol association ML model a context that describes a region of the schematic diagram surrounding the possible text label and symbol pair and a request that precisely designates the possible text label and symbol pair, to produce a score indicating confidence in association. The schematic diagram data extraction application selects associations between text labels and symbols based on the scores. Further, the schematic diagram data extraction application determines possible text label and link pairs from the set of texts labels and the set of links, and for each possible text label and link pair, applies to a link association ML model a set of multiple features describing at least the geometric relationship between the possible text label and link pair, to produce a score indicating confidence in association. The schematic diagram data extraction application selects associations between text labels and links based on the scores. Finally, it outputs the selected associations between text labels and symbols and text labels and links in a machine-readable format.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which.

DETAILED DESCRIPTION

Definitions

As used herein, the term "symbol" refers to a graphical representation of either a physical component (e.g., valve, pump, vessel, instrument, etc.) or an abstraction (e.g., an off-page reference) in a schematic diagram (e.g., a P&ID).

As used herein, the term "link" refers to a connection in a schematic diagram (e.g., a P&ID) between two or more symbols. A link is typically composed of one or more line segments.

As used herein the term "text label" refers to a set of letters and/or numbers that provide description of a symbol or link in a schematic diagram (e.g., a P&ID). Typically, a text label takes the form of a name, code, property, or other identifier that conveys information about the type, parameters and/or function of the symbol or link.

Example Embodiments

Figure 1A:
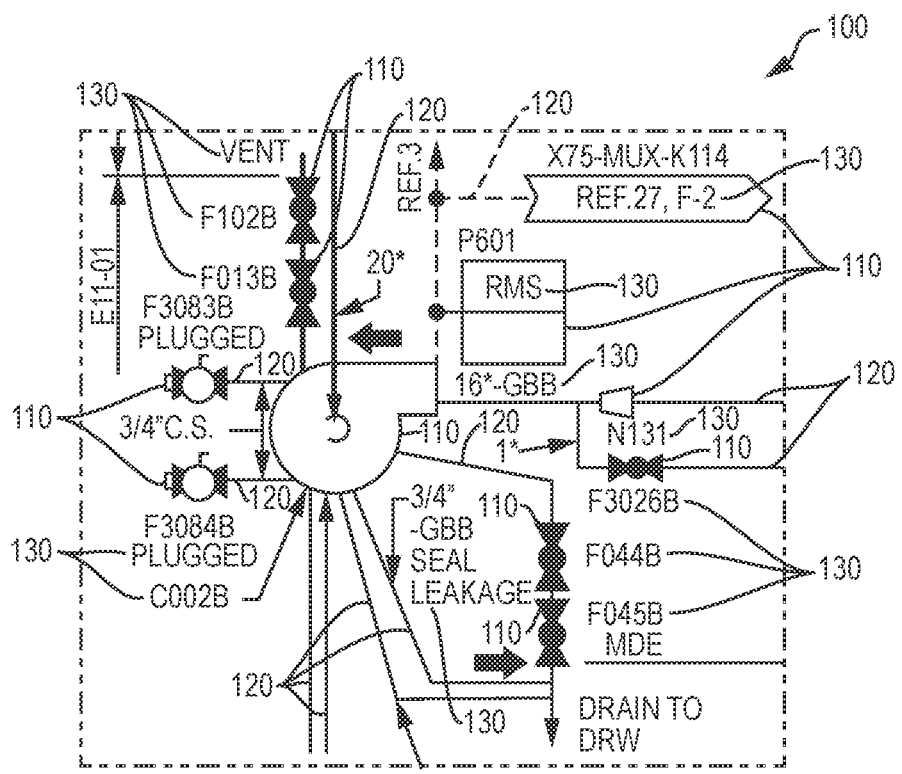
FIG. 1A is a view of a portion of an example P&ID.
Figure 1B:
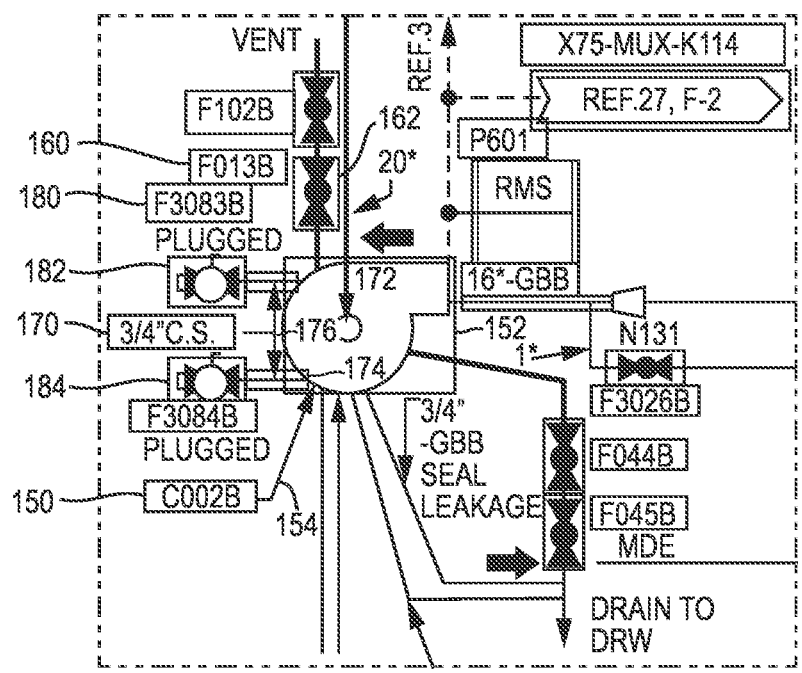
FIG. 1B is annotated view of the example P&ID of FIG. 1A, showing accurately extracted associations between text labels and symbols and links.
Figure 2:
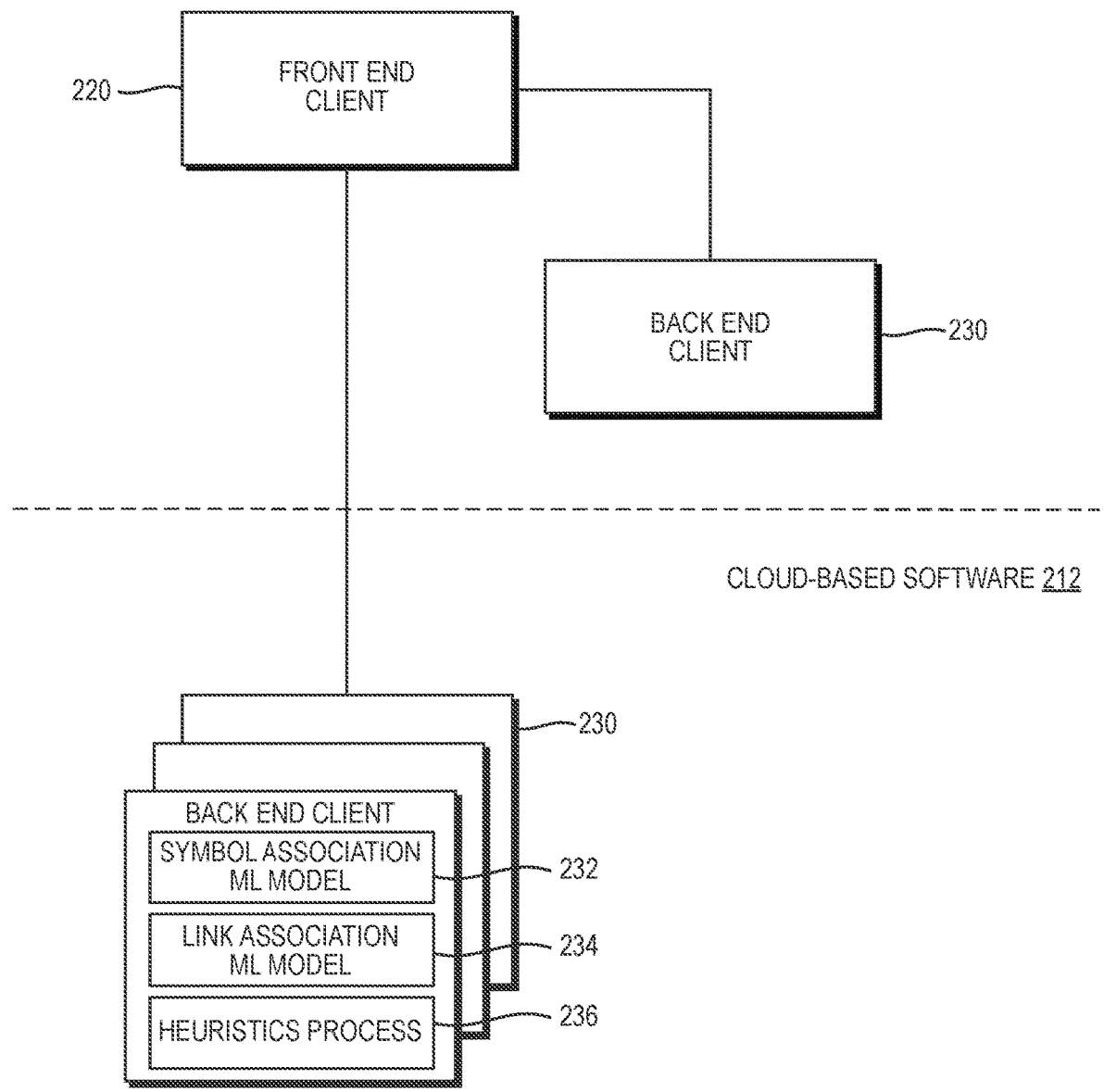
FIG. 2 is a high-level block diagram of an example schematic diagram data extraction application.

FIG. 2 is a high-level block diagram of an example schematic diagram data extraction application. The schematic diagram data extraction application 200 may be a stand-alone software application or a component of a larger software application, for example, a design and modeling software application. The software may be divided into local software 210 that executes on one or more computing devices local to an end-user (collectively "local devices") and, in some cases, cloud-based software 212 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 210 may include a frontend client 220 and one or more backend clients 230 operating on a local device. The cloud-based software 212 may include, in some cases, one or more backend clients 230 operating on cloud computing devices. The frontend client 220 may provide user interface functionality as well as perform certain non-processing intensive operations. The backend client(s) 230 may perform more processing intensive operations (e.g., ML operations). To that end, the backend clients 230 may include a symbol association ML model 232 that uses a first network architecture (e.g., a deep learning neural network architecture) to produce scores indicating confidences in possible text label and symbol pairs, a link association ML model 234 that uses a second network architecture (e.g., a gradient boosting tree architecture) to produce scores indicating confidences in possible text label and link pairs, and a heuristics process 236 that performs pre-processing and/or post processing to exclude certain cases from the ML models 232, 234 or refine results therefrom. While the symbol association ML model 232, link association ML model 234, and heuristics process 236 are shown as part of a backend client 230 of the cloud-based software 212, it should be understood some or all of this software may alternatively be part of a backend client 230 of the local software 210, depending on the particular implementation.

Figure 3:
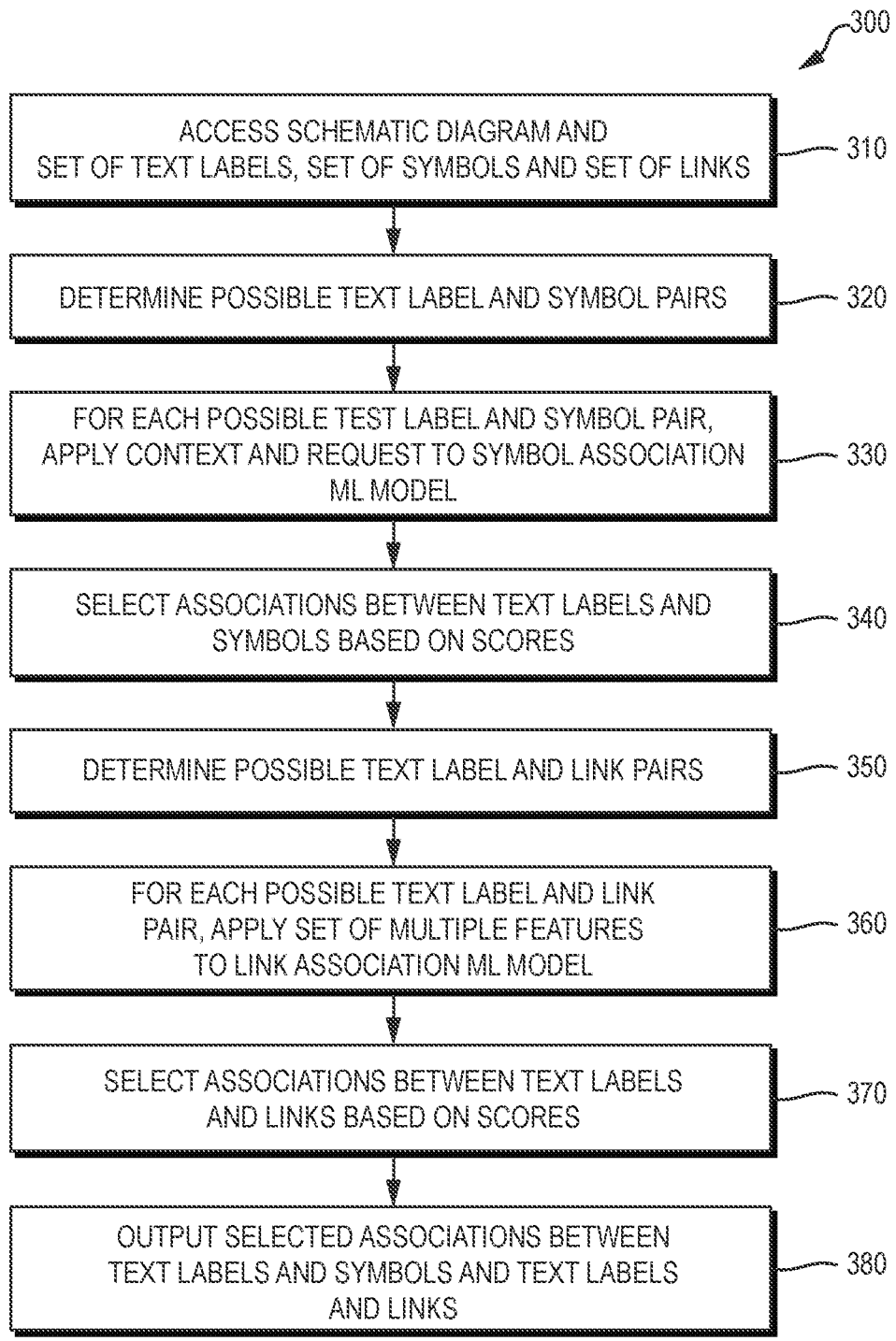
FIG. 3 is an example high-level sequence of steps that may be performed by the schematic diagram data extraction application using a symbol association ML model, link association ML model, and heuristics process to extract associations between text labels and symbols and links, respectively.

FIG. 3 is an example high-level sequence of steps 300 that may be performed by the schematic diagram data extraction application 200 using the symbol association ML model 232, link association ML model 234, and heuristics process 236 to extract associations between text labels and symbols and links, respectively. At step 310, the schematic diagram data extraction application 200 accesses the schematic diagram (e.g., P&ID) in an image-only format (e.g., a JPG, PNG, BMP, TIFF, PDF, etc.) and a set of texts labels, set of symbols, and set of links that have been extracted from the schematic diagram. As discussed above, in some cases, the schematic diagram may be obtained from a scan of a printed document. The set of texts labels, set of symbols, and set of links may have been extracted (e.g., previously by the schematic diagram data extraction application 200 or by other software) using techniques such as those described in U.S. patent application Ser. No. 17/129,205, titled "Techniques for Extracting Machine-Readable Information From P&IDs" and U.S. patent application Ser. No. 17/877,560, titled "Techniques for Extracting Links and Connectivity From Schematic Diagrams", the contents of both of which are incorporated herein by reference. The extracted texts labels may each include a bounding box of the text label, the extracted symbols may each include a bounding box of the symbol, and the extracted links may each include one or more line segments representing the link.

At step 320, the schematic diagram data extraction application 200 determines possible text label and symbol pairs from the set of text labels and the set of symbols. Mathematically, the possible pairs may be represented as $C_k=(L_i, S_j)$, where L is the set of all text labels, and S is the set of all symbols (or links), and L and are respectively a label and a symbol (or link). As part of such determination, the heuristics process 236 may perform pre-processing to exclude certain pairs from consideration by the symbol association ML model 232, such that the determined possible text label and symbol pairs are less than all pairs. Such exclusion may improve performance by reducing the number of pairs requiring ML model processing, with "easy" cases instead automatically assumed to be associated or not associated.

For example, the heuristics process 236 may exclude pairs from consideration where the text label is inside the symbol. When the bounding box of a given text label is within the bounding box of a given symbol, the heuristics process 236 may automatically associate the given text label and the given symbol, and exclude the given text label and given symbol pair from ML model processing. To address cases where a few pixels protrude outside of the bounding box of the symbol, the bounding box of a given text label may be considered to be within the bounding box of a given symbol when the intersection area divided by the area of the bounding box of the given text label exceeds a predetermined percentage (e.g., 80%). If a text label is inside multiple symbols (e.g., a larger symbol encompasses a smaller symbol which encompasses the text label), the smallest symbol is used for association.

In a further example, the heuristics process 236 may exclude pairs from consideration where the text label is under a threshold distance of a symbol. When the bounding box of a given text label is under a threshold distance of the bounding box of a given symbol, and the given text label and the given symbol mutually see each other as the closest region (i.e. among all the symbols, the closest to the given text label is the given symbol, and among all text labels, the closest to the symbol is the given text label), the heuristics process 236 may automatically associate the given text label and the given symbol, and exclude the given text label and given symbol pair from ML model processing.

In a still further example, the heuristics process 236 may exclude pairs from consideration where the text label is greater than a maximum distance from a symbol. When the bounding box of a given text label is greater than a maximum distance from a bounding box of a given symbol, the heuristics process 236 may automatically exclude the given text label and given symbol pair from the possible text label and symbol pairs. Such exclusion may again remove pairs from consideration by the symbol association ML model 232 improving performance.

At step 330, for each possible text label and symbol pair in C, the schematic diagram data extraction application 200 constructs a context and a request, and applies the context and request to the symbol association ML 232 model to produce a score indicating confidence in association.

As used herein, a "context" refers a region of the schematic diagram that encloses a possible text label and symbol pair, as well as surroundings 430 about both the text label and symbol. A context may take the form of an image of the region whose size is defined by constructing a bounding box around the bounding box of the text label and the bounding box of the symbol, and adding an amount of padding (e.g., 80 pixels) to capture surroundings. If the context is less than a minimum size (e.g., 256×256 pixels) it may be expanded to meet the minimum size. Further, if the context extends beyond the borders of the schematic diagram, its center may be adjusted so it falls fully within the schematic diagram.

As used herein, a "request" refers to a precise designation of a possible text label and symbol pair. A request may take the form of a description of the bounding box of the text label and the bounding box of the symbol.

Figure 4A:
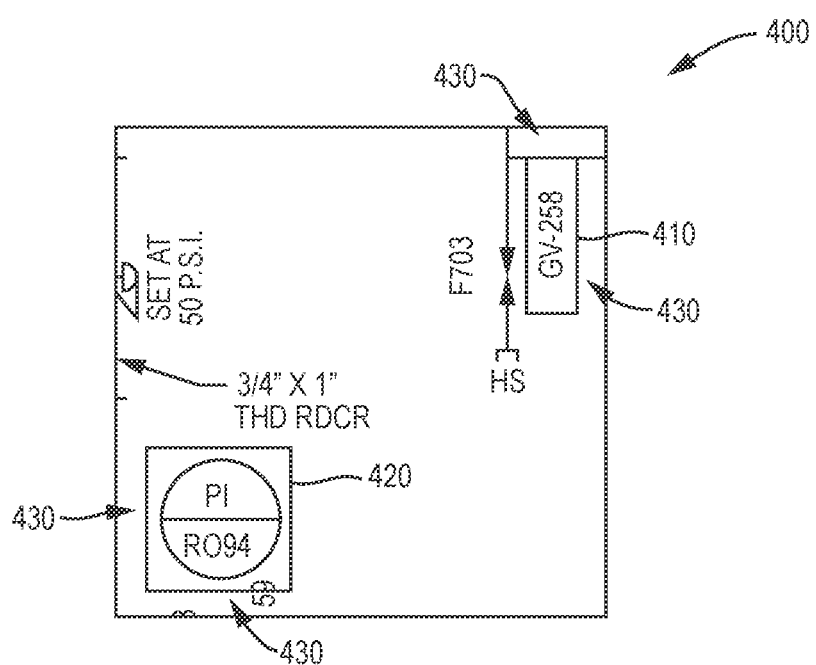
FIG. 4A is a visualization of an example context for a possible text label and symbol pair in an example P&ID.

FIG. 4A is a visualization of an example context 400 for a possible text label and symbol pair in an example P&ID. The region defined by the context encloses the bounding box 410 of the text label and the bounding box 420 of the symbol, as well as surroundings 430 about both these bounding boxes. The surroundings provide graphical cues (e.g., presence of an arrow, presence of other nearby symbols, links, or text labels, etc.) that would not be available if only a crop to the bounding box 410 of the text label and the bounding box 420 of the symbol were provided.

Figure 4B:
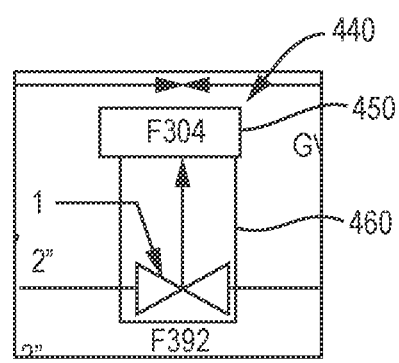
FIG. 4B is a visualization of an example request for a possible text label and symbol pair in an example P&ID.

FIG. 4B is a visualization of an example request 440 for a possible text label and symbol pair in an example P&ID. The description that makes up the request describes the bounding box 450 of the text label and the bounding box of the symbol 460. The description assists in interpretation of an eventual prediction from the symbol association ML model 232, so that the prediction is assured to be between the specific text label and symbol, and not between other text labels or symbols that may happen to be within the context. While the request 440 is visualized in FIG. 4B as a pair of bounding boxes, the description that makes up the request typically is a numeric representation (e.g., coordinates of the bounding box of the text label and the bounding box of the symbol).

Figure 5:
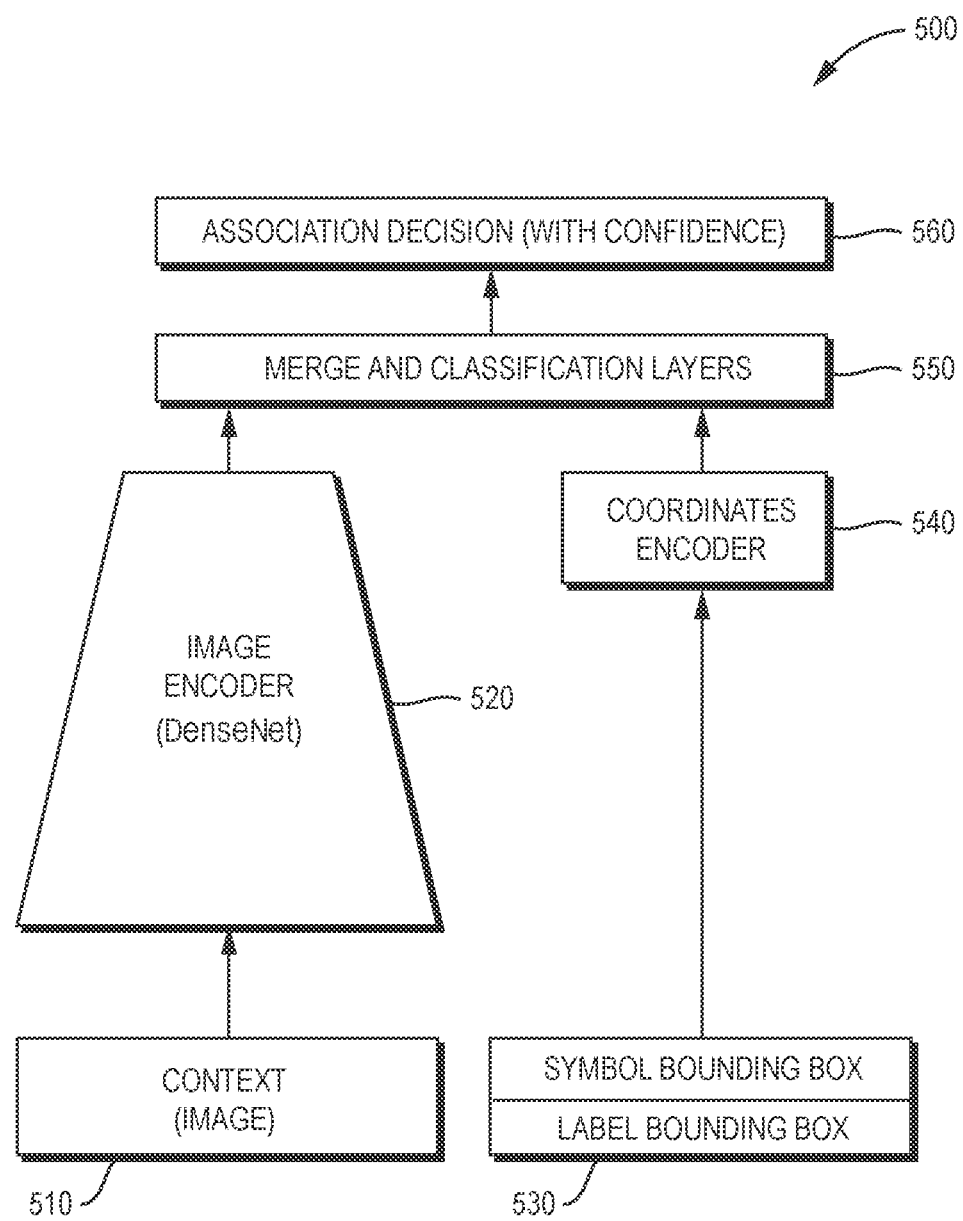
FIG. 5 is a block diagram of an example deep learning neural network architecture that may be implemented by the symbol association ML model.

As part of step 330, the context and the request are applied to the symbol association ML model 232, which as mentioned above may have a first network architecture (e.g., a deep learning neural network architecture). FIG. 5 is a block diagram of an example deep learning neural network architecture 500 that may be implemented by the symbol association ML model 232. The context 510 is provided to an image encoder 520 that distills information in the image of the region to produce an encoded context. The image encoder 520 may include a convolutional neural network backbone (e.g., a DenseNet backbone) that utilizes dense connections between layers, where all layers are connected directly with each other. Each layer may obtain additional inputs from all preceding layers and pass on its own feature-maps to all subsequent layers. The output of the convolutional neural network backbone (e.g., a DenseNet backbone) may be averaged and passed to a rectified linear unit (ReLU) activation function. Alternatively, the image encoder 520 may be differently structured and use other types of neural networks and activation functions to produce an encoded context.

The request 530 is provided to a coordinates encoder 540 that encodes the coordinates of the bounding box of the text label and the bounding box of the symbol to produce an encoded request. In one embodiment, the encoding may take the form of a Fourier encoding, where the coordinates encoder 540 produces the Fourier encoded coordinate of the bounding box of the text label and the bounding box of the symbol. For example, a Fourier encoding E(p) may be defined as:

$$E(p) = [\cos(2\pi p_x), \sin(2\pi p_x), \cos(2\pi p_y), \sin(2\pi p_y)]$$

where p is a point at one of the bounding box coordinates to encode, and the coordinates are initially represented by a Cartesian coordinate system. The Fourier encoded request may be sequenced in a standardized order (e.g., encoding of the symbol bounding box first then encoding the text box bounding box). It should be understood that, alternatively, other forms of encodings may be used. For example, in an alternative implementation a mask encoder may be used where each context bounding box is represented by a binary image of the same size as the context, where pixels set to a predetermined value (e.g., 1) indicate the position of the symbol or label.

During training of symbol association ML model 232, the coordinates of the bounding box of the text label and the bounding box of the symbol of the request may be intentionally varied by addition of noise (e.g., gaussian noise). This may assist the model in accustoming itself to real-world data, where bounding boxes may not be perfectly aligned with the respective text label or symbol.

As a further part of step 330, the encoded context and the encoded request are provided to a merge and classification neural network 550 that includes a set of fully connected layers that are trained to produce an association decision 560. The merge and classification neural network 550 may include multiple (e.g., 3) fully connected layers of decreasing sizes (e.g., 256, 64, and 3 respectively), the last of which outputs the association decision 560. The association decision may take the form of a score indicating confidence in association between the text label and symbol pair, which may be mathematically represented as $a_k$ for pair $C_k$ with a value of 1 indicating they are definitely associated and a value of 0 indicating they are definitely not associated.

During training, the symbol association ML model 232 may use a loss function that includes a penalty to associations that is quadratically increasing with distance. There is often an exponential distribution in schematic diagrams of text label to associated symbol distances, such that there are many associations where text labels and symbols are close, and only a few where they are not. A penalty to associations that is quadratically increasing with distance may force the model to consider the far associations despite their relatively low frequency of occurrence, while keeping the loss function smooth (i.e., without abrupt "steps" at certain distances).

Further, during training, the symbol association ML model 232 may be permitted to return associations to a placeholder "link" object. The model may have difficulty ignoring text labels that identify links (e.g., it may be difficult for the neural network to understand why some text labels should not be associated with anything). To avoid such issue, the model may be permitted in training to associate text labels with a placeholder "link" object, such association simply indicating the text label is associated with a link somewhere in the schematic diagram. Use of a "link" object may provide a clearer learning objective since text labels that identify links may now be associated with something.

At step 340, once all possible text label and symbol pair have been processed and association decisions rendered, the schematic diagram data extraction application 200 selects associations between text labels and symbols therefrom based on the scores, to produce text label to symbol associations. In one implementation, the selection may include a maximum selection where, for a given text label, the text label and symbol pair with the score indicating the greatest confidence is selected as the association. The selection may also include a configurable minimum confidence threshold (e.g., 0.5), which excludes text label and symbol pairs when the score indicates a low confidence of association.

At step 350, the schematic diagram data extraction application 200 determines possible text label and link pairs from the set of texts labels and the set of links. As mentioned above, the possible pairs may be represented as $C_k=(L_i,S_j)$. As part of the determination, the heuristics process 236 may perform pre-processing to exclude certain pairs, such that the determined possible text label and symbol pairs are less than all pairs. For example, the heuristics process 236 may exclude any pairs from consideration where the text label has already been associated with a symbol as part of step 340. Further, the heuristics process 236 may exclude any pairs from consideration where the link is greater than a maximum distance from the text label (e.g., outside a radius extending from the center of the bounding box of the text label). Such exclusions may remove pairs from consideration by the link association ML model 234 that are unlikely from being associated, saving processing resources and avoiding potential false positives.

At step 360, for each possible text label and link pair in $C_k$, the schematic diagram data extraction application 200 computes a set of multiple features, and applies the set of multiple features to the link association ML 234 model to produce a score indicating confidence in association. The set of multiple features may take the form of a multidimensional feature vector. An N-element multidimensional feature vector $X_k$ that describes the candidate pair $C_k$, may be mathematically given as:

$$X_k=[x_{k1}, x_{k2}, \ldots x_{kN}]^T,$$

where x are individual feature values. The multidimensional feature vector $X_k$ may be computed by a module of the schematic diagram data extraction application 200 which takes a text label and link pair $C_k$ and outputs a multidimensional feature vector $X_k$.

Features may include geometric features (i.e., features that describe geometric relationships between the possible text label and link pair) and, in some implementations, non-geometric features (i.e., features that describe textual metadata that may indicate a relationships between possible text label and link pairs). For example, the features may include a link type, a link to text label distance, a relative position between the text label and the link, an orientation of the text label, an orientation of the link, a projection of a baseline of the text label onto the link, projection angles between the link and a baseline of the text label, a collision cost, and/or an aspect ratio of a bounding box that includes both the text label and the link. Each of these example features are discussed briefly below in turn.

A link type feature may indicate a nature of connection provided by the link, for example, a process flow connection, an electrical connection, a pneumatic connection, etc., which may provide cues as a type of text label that may be associated with the link.

Figure 6:
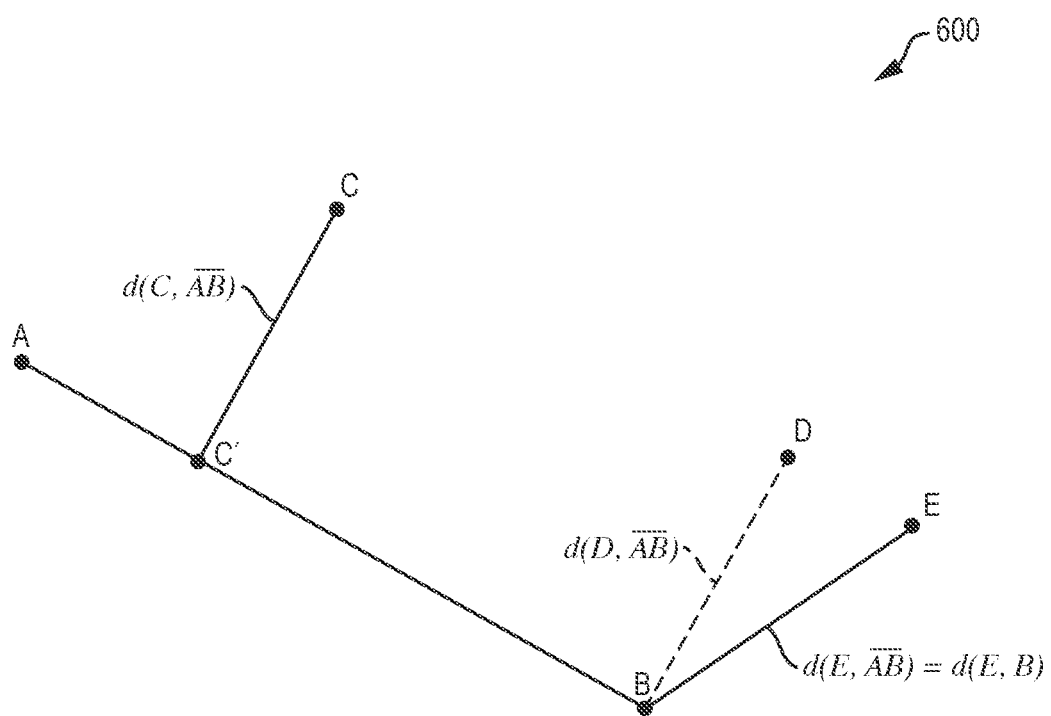
FIG. 6 is a diagram illustrating examples of computation of distance between points and a finite line segment.

A link to text label distance feature may indicate distance between these two items. In one implementation, it may be a function of the distance of all corners of the bounding box of the text label to the link. The distance from one corner of the bounding box may be computed as the distance from a point representing the corner to a finite line segment representing the link. FIG. 6 is a diagram 600 illustrating examples of computation of distance between points and a finite line segment. Points C and D both have a perpendicular projection on to line segment $\overline{AB}$, and their distance is given by the distance from the point to the line. Point E does not project onto segment $\overline{AB}$, and thus its distance is simply the Euclidean distance from E to B.

A relative position between the text label and the link feature may indicate the text label is either below or above a substantially horizontal link, or is to the left or the right of a substantially vertical link. The relative position may be mapped to numerical values (e.g., 0 for below/left or 1 for above/right).

An orientation of the text label feature may indicate a baseline of the text label is substantially horizontal or is substantially vertical. The baseline may be equivalent to the text label's bounding box's bottom edge (e.g., for horizontal text) or a side edge (e.g., for vertical text). The orientation of the text label may be mapped to numerical values (e.g., 0 for substantially horizontal or 1 for substantially horizontal).

An orientation of the link feature may indicate a line segment representing the link is substantially horizontal, vertical or diagonal. The orientation may first be calculated as angle. For a line segment that is undirected, some angles may be equivalent (e.g., 90°, −90°, and 270° all represent the same orientation of a undirected line segment in space). As such, the angle may be converted to a predetermined range (e.g., −90° to) 90° and such converted angle then subject to thresholds to evaluate whether it is substantially horizontal, vertical or diagonal.

Figure 7:
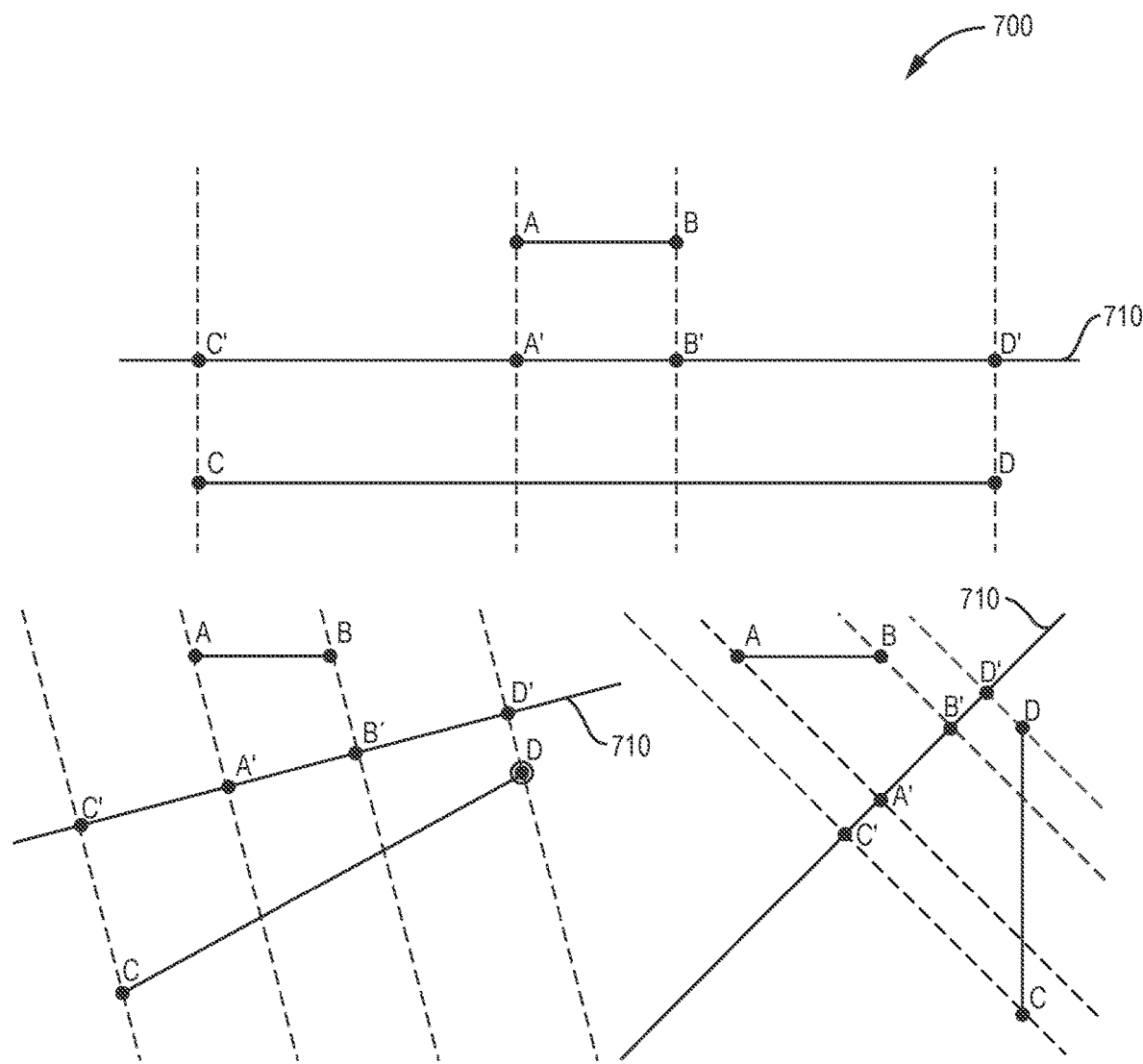
FIG. 7 is a diagram illustrating examples of projection of a baseline of a text label onto a link, for three different example scenarios.

A projection of a baseline of the text label onto the link feature may indicate relationships between the baseline and link. It may be characterized by two parameters that represent a footprint of the baseline of the text label on the link, and a footprint of the link on the baseline of the text label. FIG. 7 is a diagram 700 illustrating examples of projection of a baseline of a text label onto a link for three different example scenarios. The baseline of the text label may be equivalent to the text label's bounding box's bottom edge (e.g., for horizontal text) or a side edge (e.g., for vertical text), and represented as a line segment $\overline{AB}$. The link may be represented by a line segment $\overline{CD}$. A bisecting line 710 may be constructed between line segment $\overline{AB}$ and line segment $\overline{CD}$ at an orientation that divides in half the angle between $\overline{AB}$ and $\overline{CD}$. Projection $\rho_{AB}$ is formed on the bisecting line 710 and shown as line segment $\overline{A'B'}$, and projection $\rho_{CD}$ is formed on the bisecting line 710 and shown as line segment $\overline{C'D'}$.

Figure 8:
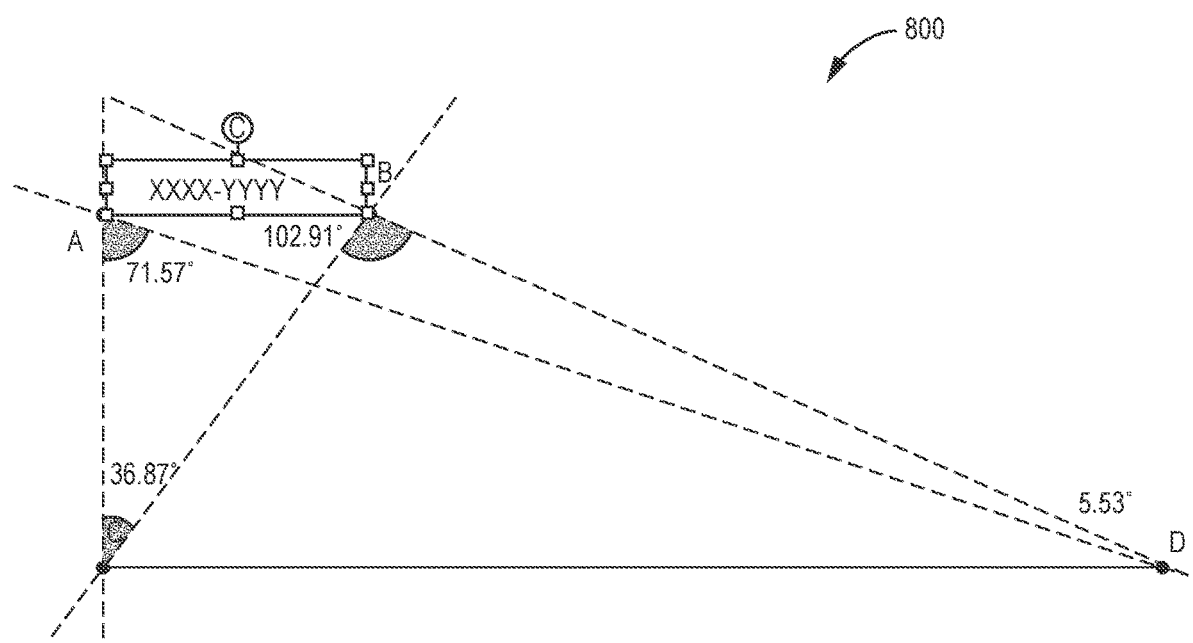
FIG. 8 is a diagram illustrating examples of calculation of projection angles between a link and a baseline of a text label.

A projection angles between the link and a baseline of the text label feature may indicate multiple angles between the link and baseline. In one implementation it may include the four angles created when each of the endpoints of a line segment representing the link are projected to each of the endpoints of the baseline of the text label, and when each the endpoints of the baseline of the text label are projected to the endpoints of the line segment representing the link. The angles are akin to a field of view (FOV). FIG. 8 is a diagram 800 illustrating examples of calculation of projection angles between a link and a baseline of a text label. The baseline of the text label is represented as a line segment $\overline{AB}$ and the link is represented by a line segment $\overline{CD}$. At each endpoint A-D an angle (here, 71.57°, 102.91°, 36.87° and 5.53°) is computed.

Figure 9:
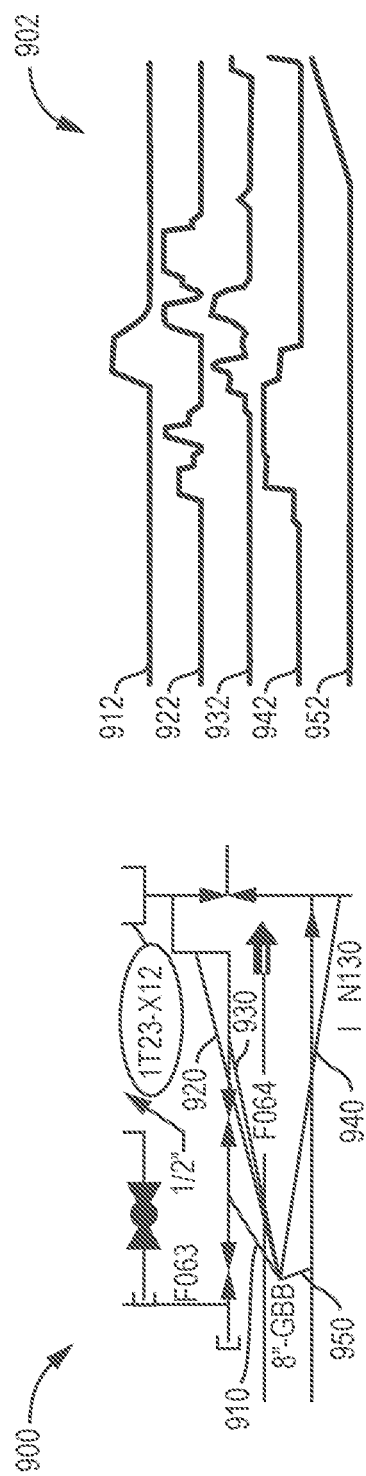
FIG. 9 is a diagram illustrating examples of calculation of collision cost.

A collision cost feature may indicate a cost of obstacles encountered (e.g., non-white pixels, of symbols, links, and other text labels) between a text label and a link. FIG. 9 is a diagram 900 illustrating examples of calculation of a collision cost. Five different text label and link pairs are shown. For each pair, connecting line segments 910, 920, 930, 940, 950 may be drawn between a center of the bounding box of the text label and a nearest point on the line segment representing the link, as shown on the left side 900 of FIG. 9. Collision cost may be an accumulation of obstacles encountered (e.g., non-white pixels, of symbols, links, and other text labels) on the connecting line segments, graphically indicated by raised portions in the plots 912, 922, 932, 942, 952, as shown on the right side 902 of FIG. 9.

Finally, an aspect ratio of a bounding box that includes both the text label and the link feature may indicate a ratio of width of such bounding box to height.

It should be understood that a wide variety of additional features may additionally, or alternatively, be calculated and that the above listing is simply an example. Features may be represented as individual numeric values in the multidimensional feature vector or multiple features may be encoded into a single value included in the multidimensional feature vector to indicate dependency between features. For example, orientation of a text label and orientation of a link may be combined into a single feature value indicating matching orientations. Such combination may improve efficiency when the multidimensional feature vector $X_k$ is applied to the link association ML model 234.

As part of step 360, each possible label and link pair $C_k$ and multidimensional feature vector $X_k$ is applied to the link association ML model 234, which as mentioned above, may have a second network architecture (e.g., a gradient boosting tree architecture). A gradient boosting tree is an ensemble technique that combines many weak learning decision trees to create one strong learner. The trees are typically connected in series, and boosting focuses on sequentially adding up these weak learning trees so that each tree tries to minimize the error of the previous tree. The association decision may take the form of a score indicating confidence in association between the text label and link pair, which may be mathematically represented as $p_k$ for pair $C_k$ with a value of 1 indicating they are definitely associated and a value of 0 indicating they are definitely not associated.

During training, each text label and link pair and its accompanying multidimensional feature vector may be applied to the link association ML model 234 separately (i.e., without any information about one another), such that learning occurs independent of any cross-pair relationships. In alternative implementations, however, related label and link pairs may be provided together. Further, during training, no limitation may be placed on the number of links each text label is associated with, nor the number of text labels each link is associated with (i.e., the model is not constrained to learn only one-to-one associations, and can also learn one-to-many and many-to-one associations).

At step 370, once all possible text label and link pairs have been processed and association decisions rendered, the schematic diagram data extraction application 200 selects associations between text labels and links therefrom based on the scores, to produce text label to link associations. In one implementation, the selection may include a configurable minimum confidence threshold (e.g., 0.5), which excludes text label and link pairs when the score indicates a low confidence of association. Remaining pairs may be further post-processed by the heuristics process 236 to remove pairs that may satisfy the minimum confidence threshold. For example, pairs where the distance between the text label and link exceed a maximum threshold may be excluded. Further, a configurable limit may be placed on the number of links each text label and the number of text labels each link, may be associated with. The configurable limit may be defined by a parameter pair (M,N) where M is a number of unique links one text label can be associated with, and N is a number of unique text labels one link can be associated with). For example, prediction may be limited to one-to-one relationships using a parameter pair (1,1). Filtering of predicted associations to meet these configurable limits may be performed by the heuristics process 236 based on a simple metric such as greatest scores or smallest distance, or a more involved technique such as a linear sum assignment (LSA).

At step 380, the schematic diagram data extraction application 200 outputs (e.g., stores to memory, displays on a screen, transmits over a network, etc.) the selected associations between text labels and symbols and text labels and links in a machine-readable format. Where the output is stored or transmitted over a network, it may take the form of a JSON file that includes the associations as well as their respective scores indicating confidence therein.

In summary, the above description details example techniques for extracting associations between text labels and symbols or links in schematics diagram in image-only formats. It should be understood that various adaptations and modifications may be readily made from these techniques, to suit various implementations and environments. While it is discussed above that many aspects of the techniques are implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for extracting associations between text labels and symbols or links in a schematic diagram in an image-only format, comprising:
   accessing, by an application executing on one or more computing devices, the schematic diagram and a set of texts labels, a set of symbols, and a set of links that have been extracted from the schematic diagram;
   determining possible text label and symbol pairs from the set of texts labels and the set of symbols;
   for each possible text label and symbol pair, applying to a symbol association machine learning (ML) model a context that describes a region of the schematic diagram surrounding the possible text label and symbol pair and a request that precisely designates the possible text label and symbol pair, to produce a text label-symbol score indicating confidence in association;
   selecting, by the application, associations between text labels and symbols based on the text label-symbol scores;
   determining possible text label and link pairs from the set of texts labels and the set of links;
   for each possible text label and link pair, applying to a link association ML model of the application a set of multiple features describing at least the geometric relationship between the possible text label and link pair, to produce a text label-link score indicating confidence in association;
   selecting, by the application, associations between text labels and symbols and text labels and links based on the text label-link scores; and
   outputting the selected associations between text labels and symbols and text labels and links in a machine-readable format.

2. The method of claim 1, wherein the symbol association ML model and the link association ML model use different ML architectures.

3. The method of claim 2, wherein the symbol association ML model uses a deep learning neural network architecture, and the link association ML model uses a gradient boosting tree architecture.

4. The method of claim 1, wherein, the applying to the symbol association ML model further comprises:
extracting as the context an image of the region, wherein the region encloses at least a bounding box of the text label and a bounding box of the symbol;
providing the context to an image encoder to produce an encoded context;
determining coordinates of the bounding box of the text label and the bounding box of the symbol; and
providing the coordinates to a coordinate encoder to produce an encoded request.

5. The method of claim 4, wherein the applying to the symbol association ML model further comprises:
providing the encoded context and the encoded request to a merge and classification neural network that includes a set of fully connected layers that is trained to produce the text label-symbol score.

6. The method of claim 1, wherein the determining possible text label and symbol pairs further comprises:
automatically associating a given text label and a given symbol when a bounding box of the given text label is within a bounding box of the symbol; and
excluding the given text label and given symbol pair from the possible text label and symbol pairs.

7. The method of claim 1, wherein the determining possible text label and symbol pairs further comprises:
automatically associating a given text label and a given symbol when the bounding box of the given text label is under a threshold distance of the bounding box of the symbol, and the given text label and the given symbol mutually see each other as the closest region; and
excluding the given text label and given symbol pair from the possible text label and symbol pairs.

8. The method of claim 1, wherein the determining possible text label and symbol pairs further comprises:
determining a distance from a bounding box of a given text label to a bounding box of a given symbol is greater than a maximum distance; and
excluding the given text label and given symbol pair from the possible text label and symbol pairs.

9. The method of claim 1, wherein the symbol association ML model uses a loss function during training that includes a penalty to associations that is quadratically increasing with distance.

10. The method of claim 1, wherein the applying to the link association ML model further comprises:
computing a multidimensional feature vector that represents the multiple features; and
applying the possible text label and link pair and the multidimensional feature vector to the link association ML model to produce an initial text label-link score.

11. The method of claim 10, wherein the computing the multidimensional feature vector further comprises:
encoding two or more features into a single value included in the multidimensional feature vector to indicate dependency between features.

12. The method of claim 10, wherein the determining possible text label and link pairs further comprises:
determining a distance from a given link to a bounding box of a given text label is greater than a maximum distance; and
excluding the given text label and given link pair from the possible text label and link pairs.

13. The method of claim 10, wherein the applying to the link association ML model further comprises:
determining a given text label is already associated with greater than a limit for number of links; and
preventing association of the given text label and given link.

14. The method of claim 1, wherein the multiple features comprise one or more of a link type feature, a link to text label distance feature, a relative position between the text label and the link feature, an orientation of the text label feature, an orientation of the link feature, a projection of a baseline of the text label onto the link feature, a projection angle between the link and a baseline of the text label feature, a collision cost feature or an aspect ratio of a bounding box that includes both the text label and the link feature.

15. The method of claim 1, wherein the schematic diagram is a piping and instrumentation diagram (P&ID).

16. A computing device comprising:
a display screen;
a processor; and
a memory coupled to the processor and configured to store a schematic diagram in an image-only format and a schematic diagram data extraction application that includes a symbol association machine learning (ML) model having a first ML architecture and a link association ML model having a second, different ML architecture, the schematic diagram data extraction application when executed operable to:
access a schematic diagram and a set of texts labels, a set of symbols, and a set of links that have been extracted from the schematic diagram,
determine possible text label and symbol pairs from the set of texts labels and the set of symbols,
for each possible text label and symbol pair, apply a description of the possible text label and symbol pair to the symbol association ML model to produce a text label to symbol association,
determine possible text label and link pairs from the set of texts labels and the set of links,
for each possible text label and link pair, apply a description of the possible text label and link pair to the link association ML model to produce a text label to link association, and
output the text label to symbol associations and the text label to link associations in a machine-readable format.

17. A non-transitory computing device readable medium having instructions stored thereon, the instructions when executed by one or more computing devices operable to:
access a schematic diagram and a set of texts labels, set of symbols, and set of links that have been extracted from the schematic diagram;
determine possible text label and symbol pairs from the set of texts labels and the set of symbols;
for each possible text label and symbol pair, apply to a symbol association machine learning (ML) model a context that describes a region of the schematic diagram surrounding the possible text label and symbol pair and a request that precisely designates the possible text label and symbol pair to produce a text label to symbol association;
for each possible text label and link pair, apply to a link association ML model a set of multiple features describing at least the geometric relationship between the possible text label and link pair to produce a text label to link association; and output the text label to symbol associations and the text label to link associations in a machine-readable format.

18. The non-transitory electronic-device readable medium of claim 17, wherein the symbol association ML model uses a deep learning neural network architecture, and the link association ML model uses a gradient boosting tree architecture.

19. The non-transitory electronic-device readable medium of claim 17, wherein the instructions that when executed are operable to apply the symbol association ML model further comprise instructions that when executed are operable to:
  extract as the context as an image to the region, wherein the region encloses at least a bounding box of the text label and a bounding box of the symbol;
  provide the context to an image encoder to produce an encoded context;
  determine coordinates of the bounding box of the text label and the bounding box of the symbol;
  provide the coordinates to a coordinate encoder to produce an encoded request; and
  provide the encoded context and the encoded request to a merge and classification neural network that includes a set of fully connected layers that is trained to produce the text label to symbol association.

20. The non-transitory electronic-device readable medium of claim 17, wherein the instructions that when executed are operable to apply the link association ML model further comprise instructions that when executed are operable to:
  compute a multidimensional feature vector that represents the multiple features;
  apply the possible text label and link pair and the multidimensional feature vector to the link association ML model to produce an initial text label to link association; and
  adjust the initial text label to link association when one or more criteria are met to produce the text label to link association.

* * * * *

UNITED STATES PATENT AND TRADEMARK OFFICE
CERTIFICATE OF CORRECTION

| | |
|---|---|
| PATENT NO. | : 12,288,411 B2 |
| APPLICATION NO. | : 17/961337 |
| DATED | : April 29, 2025 |
| INVENTOR(S) | : Marc-André Gardner et al. |

It is certified that error appears in the above-identified patent and that said Letters Patent is hereby corrected as shown below:

In the Specification

Column 6, Line 8 reads:
"all symbols (or links), and $L$ and are respectively a label and"
Should read:
-- all symbols (or links), and $L_i$ and $S_j$ are respectively a label and --

Column 10, Line 22 reads:
"e.g., -90° to ) 90° and such converted angle then subject to"
Should read:
-- e.g., -90° to 90°) and such converted angle then subject to --

Signed and Sealed this
Twenty-sixth Day of August, 2025

Coke Morgan Stewart
*Acting Director of the United States Patent and Trademark Office*